Aug. 18, 1970 D. B. LANGMUIR 3,525,049

TRANSISTOR AMPLIFIER SIMULTANEOUS CHECKING AND PROTECTING METHOD AND APPARATUS

Original Filed June 28, 1965

INVENTOR.
DEAN BRUCE LANGMUIR

BY Rines and Rines

ATTORNEYS 3,525,049

TRANSISTOR AMPLIFIER SIMULTANEOUS CHECKING AND PROTECTING METHOD AND APPARATUS

Dean Bruce Langmuir, Sudbury, Mass., assignor to H. H. Scott, Inc., Maynard, Mass., a corporation of Massachusetts Continuation of application Ser. No. 467,584, June 28, 1965. This application Dec. 30, 1968, Ser. No. 789,656
Int. Cl. G01r *19/16, 31/02;* H03f *3/42*
U.S. Cl. 330—2 1 Claim

ABSTRACT OF THE DISCLOSURE

This disclosure deals with a voltage-control variable resistance indicator employed in a novel manner to check and protect transistor amplifier stages and the like, inadvertently mis-wired, from burn out upon application of power; and simultaneously, by distinctly different illumination indications, to make evident proper operational wiring or mis-wiring.

Figures 1, 2:
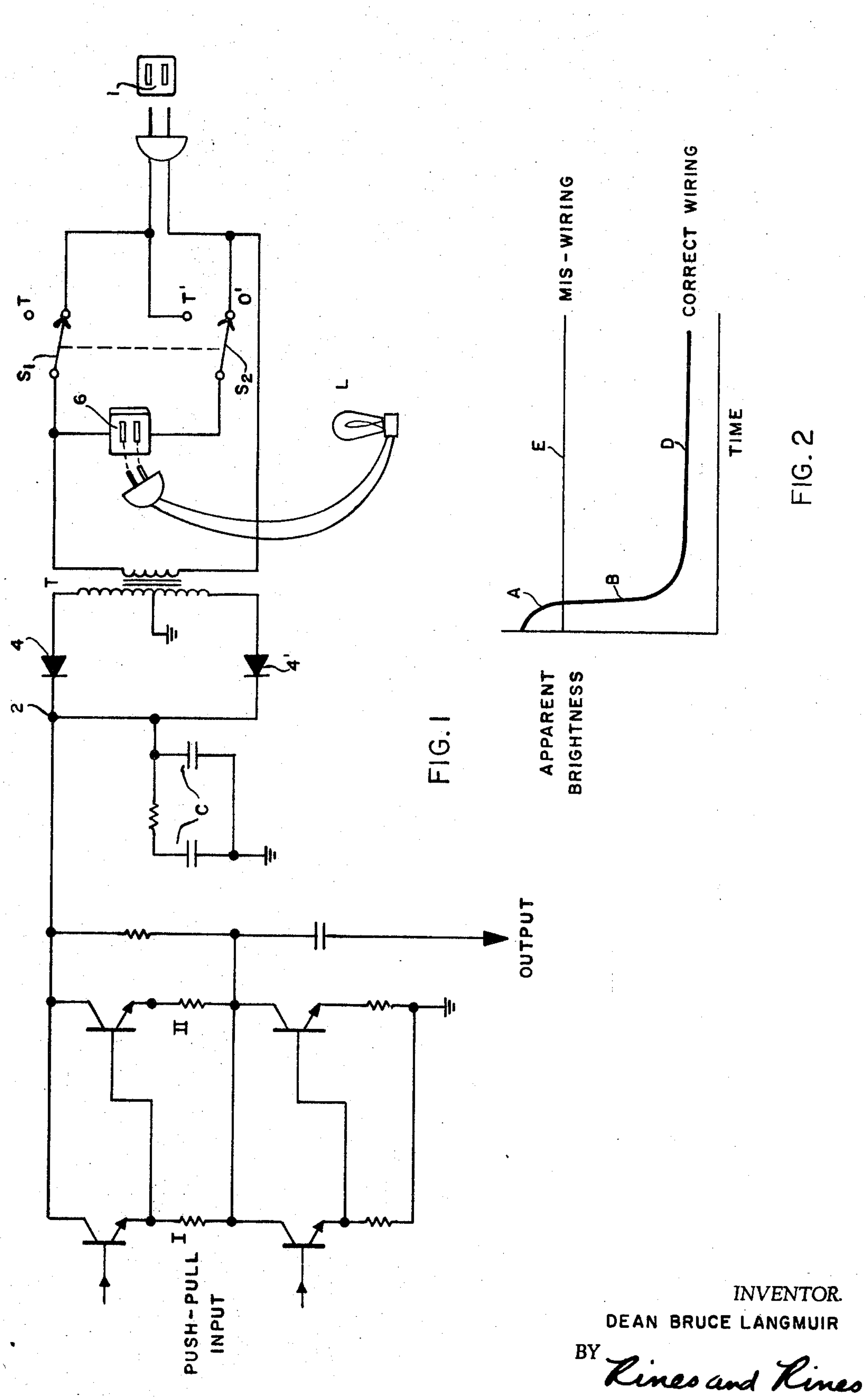

This application is a continuation of Ser. No. 467,584, filed June 28, 1965, now abondoned.

The present invention relates to transistor amplifier checking methods and apparatus, being more particularly directed to apparatus for determining wiring defects, including short-circuits and the like, in transistor power amplifier stages and similar circuits.

For several decades, electronic manufacturers have marketed electrical components in kit form for assembly by the purchaser; such kits having multiplied greatly in number and complexity within relatively recent years in connection with such apparatus as audio amplifiers, FM radio-frequency tuners and related circuits. The generally unskilled purchaser of such kits has little or no test equipment and is provided only with wiring diagrams and directions for assembly. While neon lamps and small incandescent lamps have been used to indicate such operational characteristics as radio-frequency power or circuit continuity in other applications, reliance must principally be based upon testing the constructed unit in use as an actual amplifier, tuner or the like, to determine whether mistakes in assembly have been made. This, however, can be very costly in the case of transistor amplifiers and related solid-state relay and other electrical circuits (all hereinafter generically referred to by the term "transistor"), since a mis-wiring of transistor electrode connections or faulty wiring short-circuits and the like can readily result in the draining of high burn-out currents by the transistor when the assembled equipment is first turned on. In addition, should transistors, inadvertently disassembled, be inserted into sockets after the equipment is initially turned on, current surges can result in burn-out, also.

It is to the obviating of these and similar difficulties that the present invention is primarily directed; it being an object of the invention to provide a novel method of and apparatus for checking the proper wiring of such transistor amplifiers and the like upon initial power turn-on, not only with safety for the transistors in the event of mis-wiring, including short-circuits and other faulty assembly, but, also, with the simultaneous provision of positive distnict visual indications representative of and discriminating between proper wiring and mis-wiring conditions.

A further object is to provide a new and improved electrical-circuit protective and indicating apparatus of more general utility, as well.

Other and further objects are hereinafter set forth and are more particularly delineated in the appended claims.

In summary, in one of its applications, the invention employs a voltage-controlled variable resistance indicator in a novel manner to check and protect transistor amplifier stages, inadvertently mis-wired, from burn-out upon application of power; and, simultaneously, by distinctly different illumination indications, to make evident proper operational wiring and mis-wiring.

The invention will now be described in connection with the accompanying drawing, FIG. 1 of which is a schematic circuit diagram illustrating a preferred embodiment of the invention; and FIG. 2 is a graph of the distinctive visual indications provided by the checking and protective system of FIG. 1.

Referring to the drawing, the invention is illustrated as applied to push-pull driver and power amplifier transistor stages I and II, the collectors of which are shown connected to the direct-current voltage-supply terminal 2 of a rectifying power supply comprising a pair of full-wave rectifier diodes 4 and 4' that charge capacitors C from alternating-current applied from the mains 1 by a power transformer T, in well-known fashion. As will later be evident, other types of transistor and related circuits and power supplies may make use of the invention, the above particular configurations being only for illustrative purposes.

In accordance with the invention, a test socket 6 is provided for receiving a voltage-controllable resistance indicator device, shown as an incandescent lamp L, of very particular power and voltage characteristics, related to the transistor circuit design, later discussed. A test switch $S_1$–$S_2$ is provided for seletively inserting the test socket 6 in series circuit between the mains outlet 1 and the power supply transformer T (and effectively in series with the collectors of the transistor stages I and II), when the switches $S_1$ and $S_2$ are operated to their respective upper contact positions T and T'; the socket 6 being available as an ordinary A.C. power outlet in shunt with the mains outlet 1 in the other switch position O–O'. If, as before discussed, the power is applied to mis-wired stages I and II, as, for example, if the base and emitter lead connections were inadvertently interchanged, particularly by the unskilled assembler, the transistor stages can readily draw high burn-out currents. By employing the indicator L, however, and critically selecting its rated wattage to correspond at least substantially to the standby power consumed by the transistor circuit I–II (preferably substantially equal thereto, such as about 15 watts in the case of push-pull transistor audio driver and power amplifier stages I and II operating with about 70 volts potential at terminal 2 and with respective transistor amplifiers of, for example, Types 2N3053 and 2N3055), appropriate protective resistance of the lamp L is inserted in series with the transistor voltage-supply terminal 2 to prevent the development of transistor burn-out conditions even under circumstances of mis-wiring, including short-circuits and related failures.

Simultaneously with such protection, however, is an illumination phenomenon that, when such an indicator L is used with capacitor storage power supply circuits feeding transistor amplifiers, provides a ready and distinctive visual indication of proper wiring connections and a clearly distinguishable different visual indication of miswiring faults. Considering the case of proper circuit connections, upon turn-on, the capacitors C cannot instantaneously assume full charge; but, depending upon the time constants of the power supply resistance and capacitance elements, rapidly approach a steady-state operational energy storage and supply condition. Assuming, therefore, no short-circuit or similar low-impedance paths in a mis-wired or faulty transistor amplifier circuit I, II connected with terminal 2 (that could give rise to the before-mentioned burn-out currents), the series-connected voltage-controllable resistance lamp L of appropriate wattage, above-discussed, will initially, during the transient surge commencing the charge-accumulation on the capacitors C, have substantially full or nearly full mains voltage applied thereto and will give a bright incandescent visual indication, represented by the region A of the "correct wiring" graph of FIG. 2. This bright indication will rapidly decrease, as at B, as the capacitors C become charged and will then remain at a steady dim value D corresponding to the fraction of the mains voltage developed across the lamp L when the circuit I–II is in correct operating condition and drawing its required power. The apparent time of the transition B between brightness A and dimness D of this indication of correct wiring operation can be regulated by adjustment of the before-mentioned time constants; and, consistent with desirable transistor power-supply requirements, may be of the order of a half-second, more or less.

If, however, mis-wiring or related faults are present, the lamp L will continually, from the very instant of turn-on, have a large portion of the mains voltage applied to it, providing the very different constant brightness indication of curve E of FIG. 2, approximating to the brightness range near full mains voltage, and, as before explained, providing at the same time that it is indicating fault, electrical protection against burn-out of the transistor amplifiers.

In more sophisticated uses, including production-line assembly, a photocell or other light or resistance-sensitive transducer (not shown) may obviously be used to monitor the characteristics of FIG. 2 and either give a visual, electrical or control indication thereof. Further modifications will obviously occur to those skilled in the art and all such are considered to fall within the spirit and scope of the invention as defined in the appended claim.

What is claimed is:

1. Apparatus for checking and simultaneously protecting against mis-wiring and related faults in an amplifier having transistor amplifier stages and the like and having a collector circuit terminal and an emitter circuit terminal adapted to be connected to power-supply means, said apparatus comprising, in combination with said amplifier, means including a pair of AC terminals for supplying alternating-current voltage; power-supply means including rectifier means having a pair of input terminals and a pair of output terminals, capacitor means having one side thereof connected to one of the output terminals of said rectifier means, the other side of said capacitor means and the other output terminal of said rectifier means being connected to a point of reference potential, and transformer means having a primary winding with terminals thereof connected to said AC terminals, respectively, and having a secondary winding with terminals thereof connected to said input terminals, respectively, of said rectifier means for causing said capacitor means to become charged with and to store rectified voltage from said supplying means, such storing becoming a steady-state operation following a transient surge upon the initial supplying of the alternating-current voltage, the duration of which is determined by the time-constants of the power-supply means; means directly connecting one of said collector circuit and emitter circuit terminals to said one side of said capacitor means and directly connecting the other of said collector circuit and emitter circuit terminals to said point of reference potential, whereby the stored rectified voltage is supplied between said emitter circuit and collector circuit terminals; and incandescent-lamp indicator means for producing an initial brightness surge indication corresponding substantially to a pre-determined brightness range during said transient surge and thereafter a steady-state dimmer indication representative of the portion of the alternating-current voltage developed across the indicator means, during proper operation of the said stages, and for producing a different indication of a continual brightness markedly greater than the said dimmer indication and in some instances substantially within the said predetermined brightness range and without an initial brightness surge, in the event of mis-wiring and related faults in the said stages, while simultaneously introducing sufficient resistance in series with said stages to protect the same againt the development of burn-out currents, said indicator means having rated wattage corresponding at least substantially to the standby power consumed by the said stages and adapted to illuminate with said predetermined range of brightness when operated at or near its said rated wattage, said indicator means having means for connecting it in series circuit with one of said AC terminals of said voltage-supplying means and the primary winding of said transformer means.

References Cited

UNITED STATES PATENTS

| | | | |
|---|---|---|---|
| 706,798 | 8/1902 | Chapman | 324—51 |
| 3,099,828 | 7/1963 | Kelley | 340—248 |

NATHAN KAUFMAN, Primary Examiner

U.S. Cl. X. R.

330—18, 22